United States Patent [19]
Huang

[11] Patent Number: 5,769,447
[45] Date of Patent: Jun. 23, 1998

[54] FOLDABLE STROLLER

[76] Inventor: Li-chu Chen Huang, No. 99, Fuchou 7th St., Chiayi City, Taiwan

[21] Appl. No.: 625,940

[22] Filed: Apr. 1, 1996

[51] Int. Cl.⁶ ........................................................ B62B 7/06
[52] U.S. Cl. ........................ 280/642; 280/650; 280/47.38
[58] Field of Search .................................... 280/642, 643, 280/647, 648, 650, 658, 47.38, 47.4

[56] References Cited

U.S. PATENT DOCUMENTS

| | | | |
|---|---|---|---|
| 4,191,397 | 3/1980 | Kassai | 280/647 |
| 4,660,850 | 4/1987 | Nakao et al. | 280/642 |
| 5,205,579 | 4/1993 | Kato et al. | 280/642 |
| 5,511,441 | 4/1996 | Arai | 280/642 |
| 5,524,503 | 6/1996 | Ishikura | 280/642 |
| 5,535,483 | 7/1996 | Cabagnero | 280/642 |

*Primary Examiner*—Brian L. Johnson
*Assistant Examiner*—Frank Vanaman
*Attorney, Agent, or Firm*—Gardere & Wynne, L.L.P.

[57] ABSTRACT

A foldable stroller includes a controlling device mounted to a U-shaped handle tube and a folding device. The controlling device includes a front and rear covers, a disk secured to the central portion of the handle tube and disposed between the front cover and the rear cover, two opposite circumferential grooves each defined at a periphery of the disk, two cables received in respective grooves and an end of each of the cables is secured to the disk. A latch is pivotally mounted to the central portion of the handle tube and is in contact with the disk. The folding device connects an upper end of each of a pair of front members, an upper end of each of a pair of rear members and an associated lower end of side portions of the handle tube and comprises a positioning seat securely mounted to each of the upper ends of the front members. A seat is slidably disposed on the upper end of the positioning seat and defines a first receptacle. A retainer seat is mounted on the upper end of the slidable seat and defines a second receptacle. A lower end of each side portion of the handle tube extends through the second receptacle and the first receptacle and then is securely mounted to the positioning seat by a pin. A spring has one end fastened to the pin. A coupling has a first end connected to the other end of the spring and a second end connected to a respective cable.

7 Claims, 8 Drawing Sheets

FOLDABLE STROLLER

BACKGROUND OF THE INVENTION

1. Field of the Invention

The present invention relates to a stroller and, more particularly, to a stroller which can be foldable by using only one hand.

2. Description of Related Art

Although a wide variety of foldable strollers have heretofore been provided, it is found, however, that conventional strollers must be folded by using two hands which is troublesome and time-consuming. Furthermore, it is difficult to control and fold the strollers if the user is carrying some goods in one hand or is holding a child.

The present invention provides an improved foldable stroller to mitigate and/or obviate the aforementioned problems.

SUMMARY OF THE INVENTION

It is accordingly a primary object of the present invention to provide a foldable stroller which can be folded by using only one hand.

The present invention provides a foldable stroller which has a pair of front members each having a lower end to which front wheel means is mounted, a pair of rear members each having a lower end to which rear wheel means is mounted, two parallel seat supporting members, a pair of armrests, and a handle tube having a central portion from which two side portions extend, characterized in that:

a controlling device is pivotally mounted to the center portion of the handle tube and includes a front cover having a pair of spaced rods extending rearwardly from one side thereof, a rear cover having a pair of corresponding holes through which the rods of the front cover extend, a disk with a bore at a center thereof rotatably secured to the handle tube and disposed between the front cover and the rear cover, two circumferential grooves each defined at a periphery of the disk and terminating in a transverse socket, two cables respectively received in each circumferential groove and an end of each of the cables securely received in each transverse socket. A latch is pivotally mounted to the handle and rests on the disk.

A folding device connects an upper end of each of the pair of front members, an upper end of each of the pair of rear members and an associated end of each side portion of the handle tube and comprises a positioning seat securely mounted to each of the upper ends of the front members. A slidable seat is slidably disposed on the upper end of the positioning seat and defines a first receptacle. A retainer seat is mounted on the upper end of the slidable seat and defines a second receptacle, each lower end of each side portion of the handle tube extends through the respective second receptacle and the first receptacle and then is securely mounted to the positioning seat by a pin. A spring has one end fastened to the pin. A coupling piece has one end connected to the other end of the spring and the other end connected to each of the associated ends of the cables.

Other objects, advantages, and novel features of the invention will become more apparent from the following detailed description when taken in conjunction with the accompanying drawings.

DESCRIPTION OF THE PREFERRED EMBODIMENTS

Figure 1:
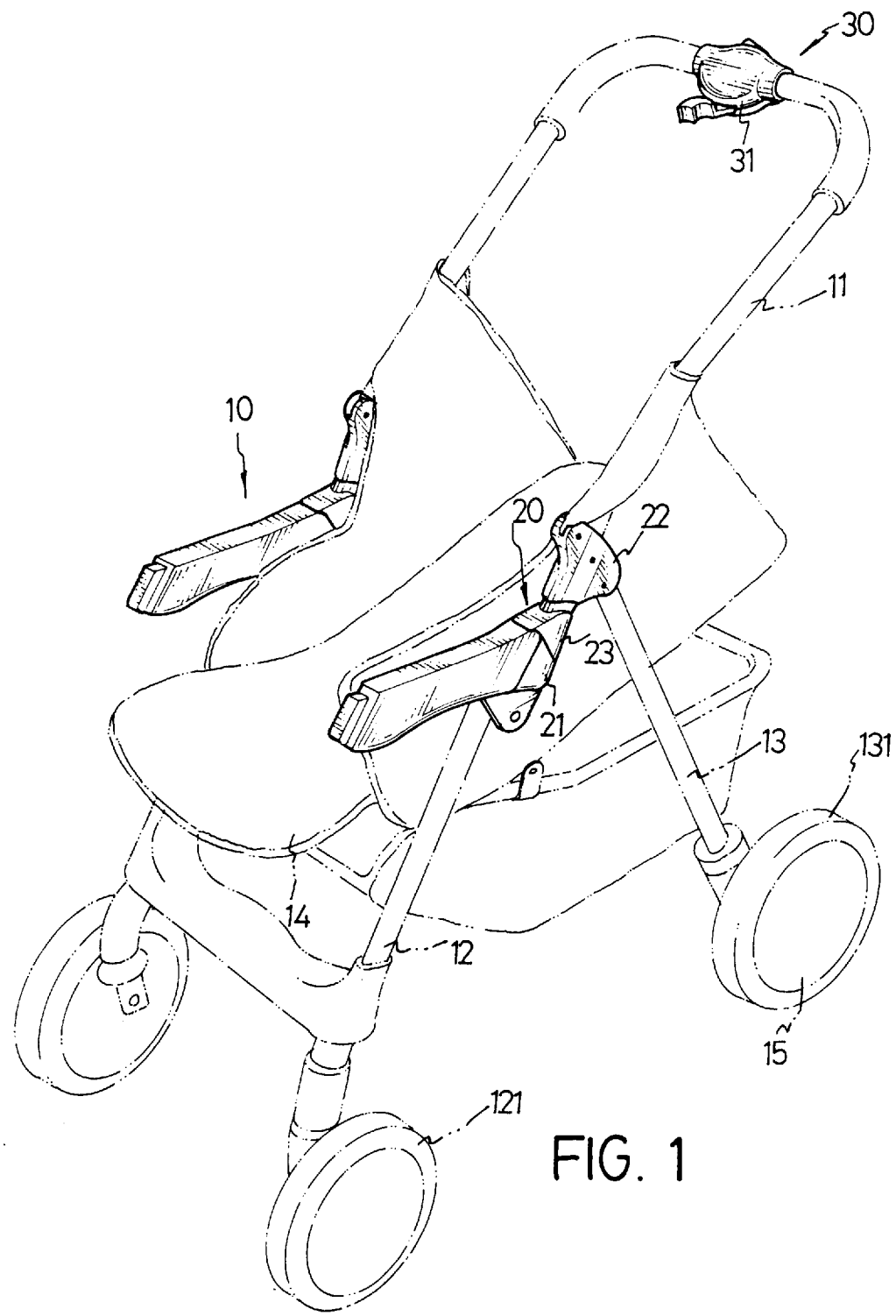
FIG. 1 is a perspective view of a foldable stroller in accordance with the present invention.
Figure 2:
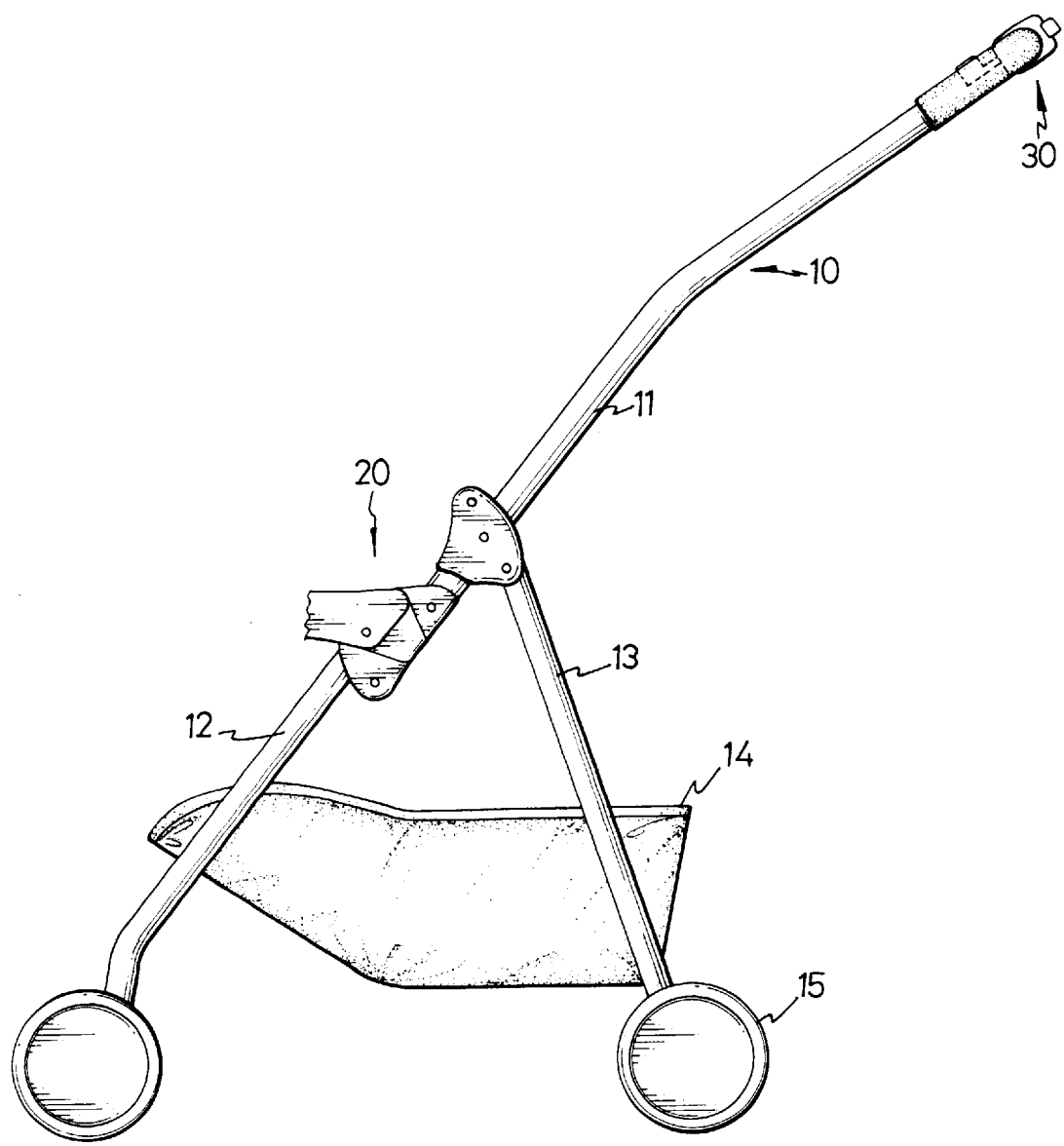
FIG. 2 is a side elevational view of the foldable stroller of FIG. 1.

Referring to the drawings and initially to FIGS. 1 and 2, a foldable stroller 10 in accordance with the present invention generally includes a U-shaped handle tube 11 having a central portion with two side portions extending therefrom, a pair of front members 12 each having a lower end to which a front wheel means 121 is mounted, a pair of rear members 13 each having a lower end to which a rear wheel means 131 is mounted, two parallel seat supporting members 14, a folding device 20 connecting an upper end of each of the pair of front members 12, an upper end of each of the pair of rear members 13 and an associated lower end of the side portions of the handle tube 11 and a controlling device 30 pivotally mounted to the central portion of the handle tube 11.

Figure 3:
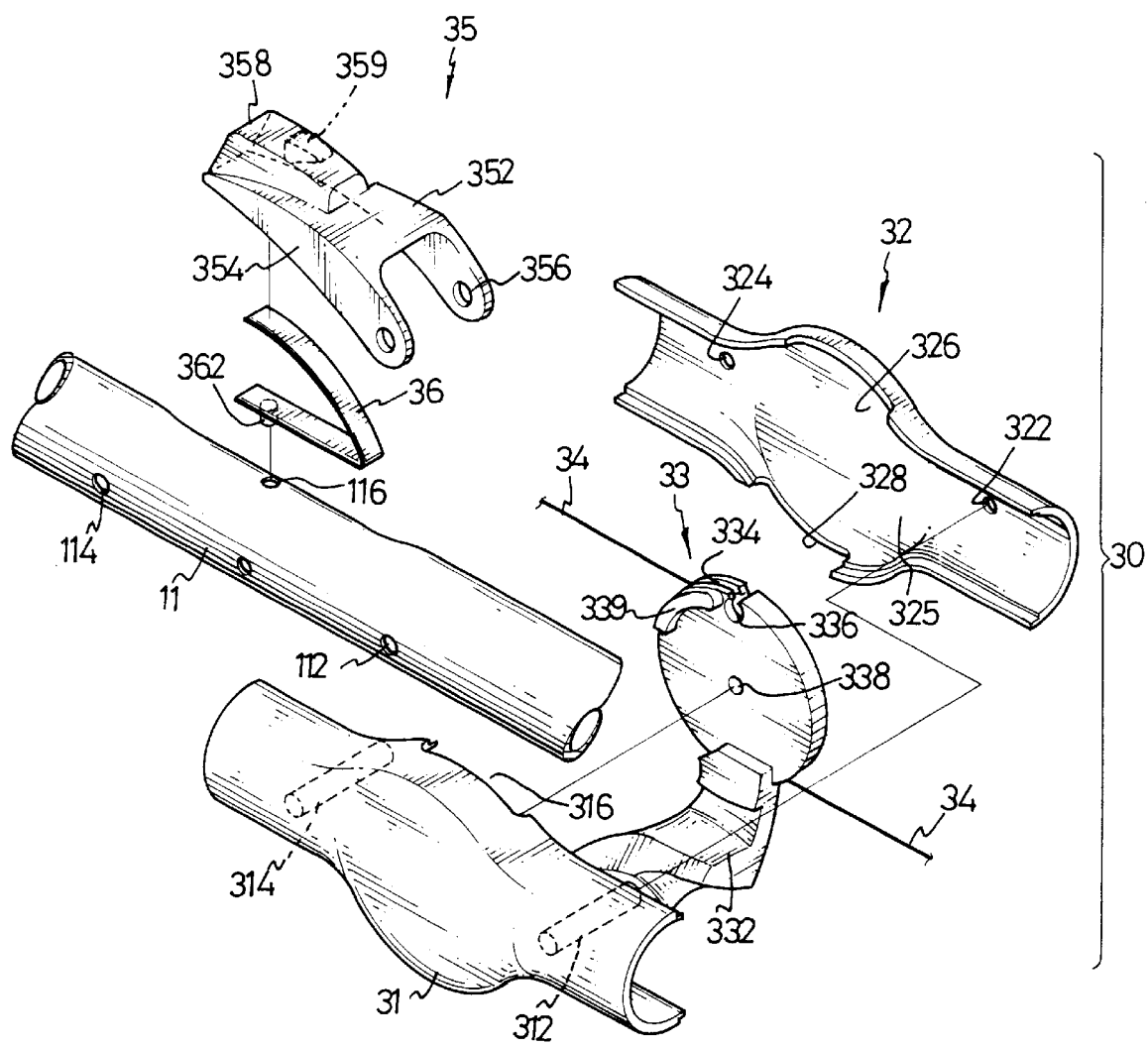
FIG. 3 is an exploded view of a controlling device of the foldable stroller.
Figure 5:
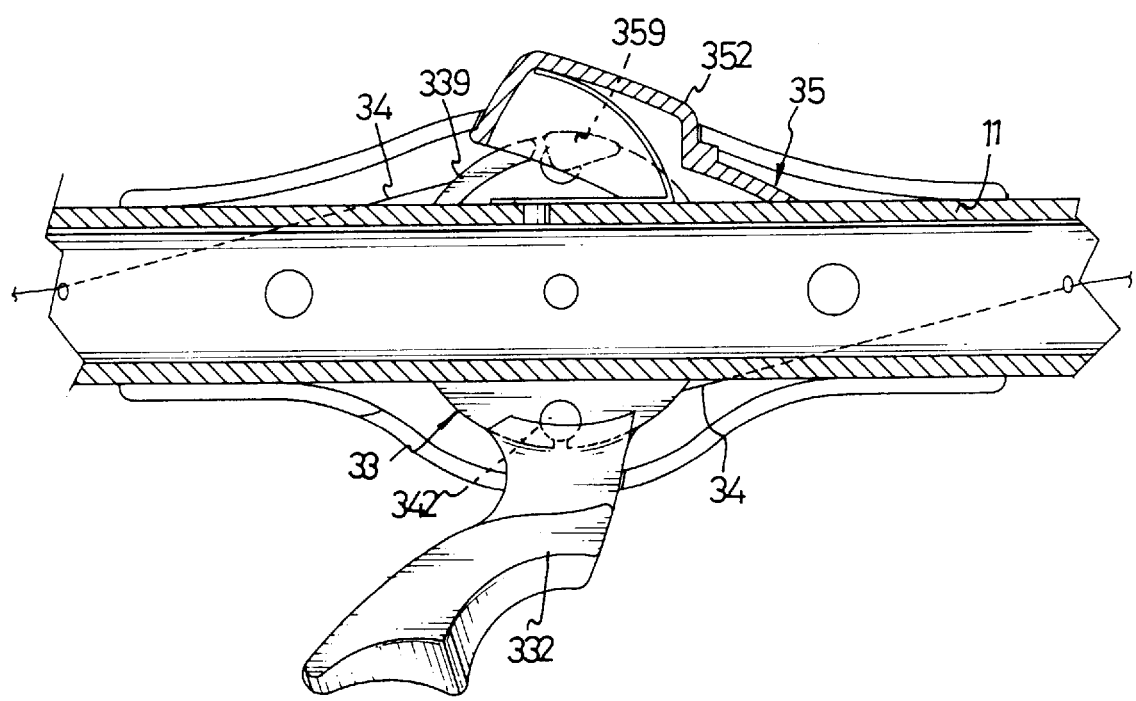
FIG. 5 is a plan view of the controlling device in which the controlling, device is in a preliminary state.

Still referring to FIG. 1 and further to FIGS. 3 and 5, the controlling device 30 includes a front cover 31 and a rear cover 32 sized and configured to extend around the central portion of the handle tube 11. It is to be noted that the front cover 31 is disproportionately greater than the rear cover 32 such that the front cover 31 extends over a greater part of a circumference of the handle tube 11. A compartment 325 is defined between the rear cover 32 and the handle tube 11. A first peg 312 and a second peg 314 are spaced apart and extend integrally and perpendicularly from an inner face of the front cover 31. A first pair of aligned transverse holes 112 corresponding to the first peg 312 is defined in the central portion of the handle tube 11. A second pair of aligned transverse holes 114 corresponding to the second peg 314 is defined in the central portion of the handle tube 11. A first hole 322 and a second hole 324 also corresponding to the first and second pegs 312, 314 are defined in the rear cover 32. A first cutout 316 is defined in a top of the front cover 31 and a second cutout 326 corresponding to the first cutout 316 is defined in a top of the rear cover 32 such that when the front and rear covers 31, 32 are combined to enclose the central portion of the handle tube 11, an opening is thereby defined. A first arcuate slot 328 is defined in a bottom of the rear cover 32.

A disk 33 comprises a lever 332 extending from a circumferential periphery thereof, two diametrically opposed circumferential grooves 334, each terminating in a transverse socket 336, and a central bore 338. An arcuate flange 339 is formed at an upper portion of a first side of the disk 33. A pin (not shown) pivotally secures the disk 33 to a side of the central portion of the handle tube 11 such that the first side of the disk 33 is adjacent to the handle tube 11.

The disk 33 is received in the compartment 325 between the handle tube 11 and the rear cover 32. The lever 332 extends through the first arcuate slot 328 of the rear cover.

A latch 35 is substantially U-shaped and has a middle portion 352 from which two spaced-apart arcuate limbs 354 downwardly extend, each limb 354 defining a pivot hole 356 near a distal tip thereof. The middle portion 352 of the latch 35 has formed on a top surface thereof a button 358 sized and configured to extend through the opening defined by the front and rear covers 31,32. The arcuate limbs 354 of the latch 35 define a distance therebetween such that the diameter of the handle tube 11 may be received therein whereby the first peg 312 of the front cover 31 is extended through one of the pivot holes 356, the first pair of transverse holes 112, the remaining pivot hole 356 and the first hole 322 of the rear cover 32. The second peg 314 extends through the second pair of transverse holes 114 and the second hole 324 of the rear cover 32. Distal tips of the first peg 312 and the second peg 314 can be deformed, e.g., by heat, after they have projected through the rear cover 32 such that the front cover 31, the rear cover 32, the disk 33 and the latch 35 can be securely assembled together.

Figure 6:
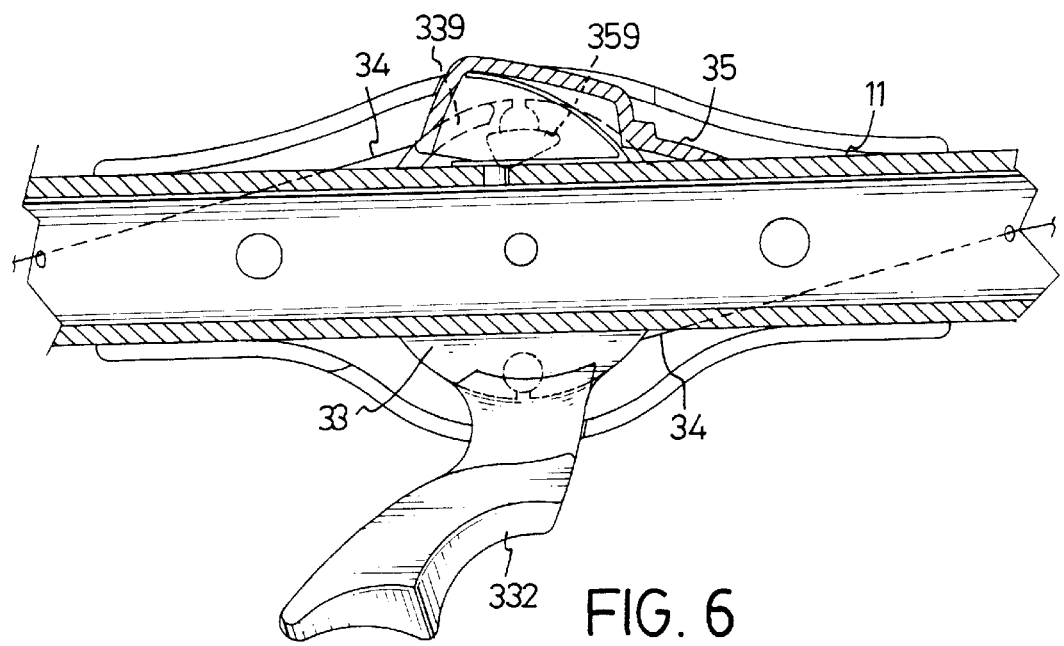
FIG. 6 is a plan view of the controlling device in which a latch of the controlling device is pressed downwardly.

A resilient member 36, for example, a leaf spring, has a flat element and an arcuate element integrally extending upwardly from one end thereof, and a location lug 362 extending downwardly from a bottom face of the flat element. The resilient member 36 is disposed between a top of the central portion of the handle tube 11 and an underside of the middle portion 358 of the latch 35 with the location lug 362 being securely retained in a top hole 116 defined in the top of the central portion of the handle tube 11. Whereby the resilient member 36 urges upwardly the latch 35 so that the button 358 projects reciprocatingly through the opening. Furthermore, an inner face of one of the arcuate limbs 354 has perpendicularly formed thereon a stop 359 sized and disposed to abut the arcuate flange 339 when the latch 35 is in a non-depressed condition as shown in FIG. 5, whereby the controlling device 30 is in an engaged state. A pair of cables 34 each have a first end with a nipple 342 fixed thereto. The nipples 342 are sized and configured to be received in respective sockets 336 of the disk 33 whereby the cables 34 are received in the corresponding circumferential grooves 334 and further extend in opposite directions inside the handle tube 11. Referring to FIG. 6, the latch 35 is depressed by a user by which abutment between the stop 359 and the arcuate flange 339 is released and the lever 332 can pivot to a fully disengaged state as shown in FIG. 7.

Figure 4:
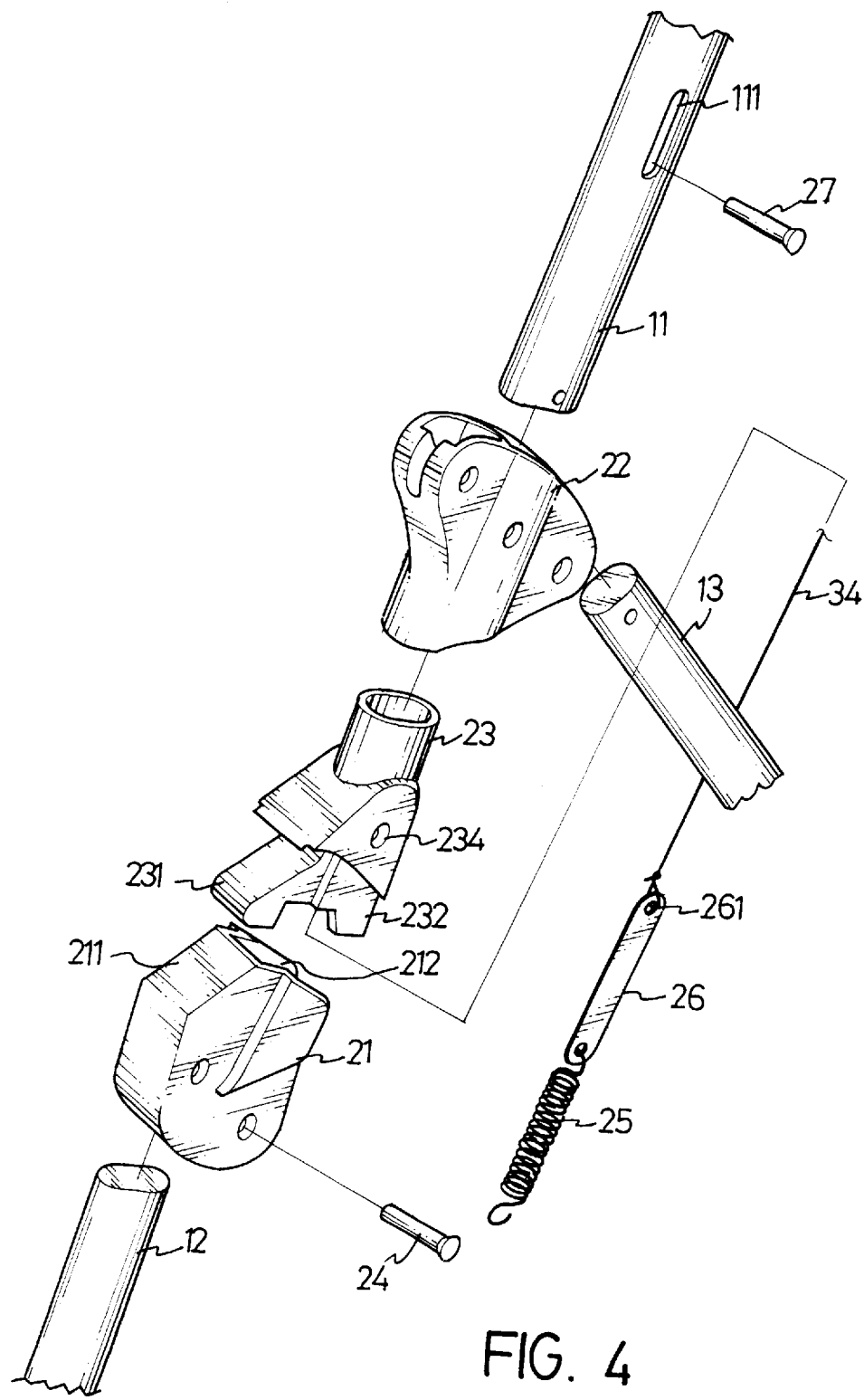
FIG. 4 is an exploded view of a folding device of the foldable stroller.
Figure 8:
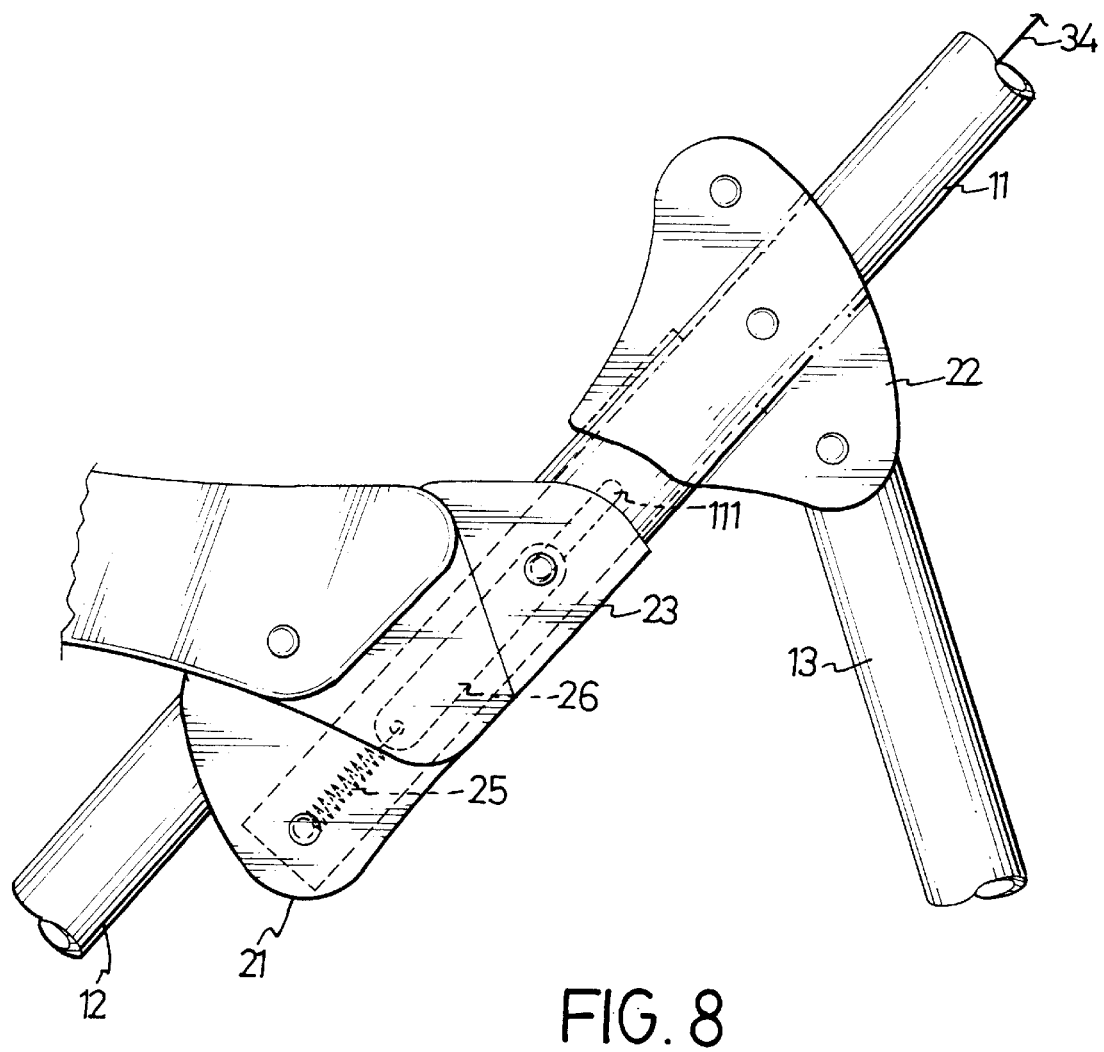
FIG. 8 is a plan view of the folding device in which a slidable seat is engaged with a positioning seat.

Referring to FIG. 1 and further to FIGS. 4 and 8, the folding device 20 comprises a positioning seat 21 securely mounted to each of the upper ends of the front members 12, a retainer seat 22 securely mounted to each of the upper ends of the rear front member 13, and a slidable seat 23 slidably disposed between an upper end of the positioning seat 21 and a lower end of the retainer seat 22. The positioning seat 21 has an inclined surface 211 formed at a front portion and a space 212 defined therewithin. A bottom of the slidable seat 23 forms a slope portion 231 matched to the inclined surface 211 and a positioning portion 232 received in the space 212. The slidable seat 23 defines a first receptacle and the retainer seat defines a second receptacle, whereby the associated lower end of each of the side portions of the handle tubes 11 extends through the second receptacle and the first receptacle and then is securely mounted to the positioning seat 21 by a pin 24. A spring 25 is disposed within the positioning seat 21 and has one end fastened to the pin 24. A coupling 26 has one end connected to the other end of the spring 25 and the other end connected to each of the associated ends of the cables 34. Additionally, each of the side portions of the handle tube 11 defines an elongate hole 111 and a linking pin 27 extends through the elongate hole 111 and is received in a first hole 261 of the upper end of the coupling 26 and a second hole 234 of the slidable seat 23.

Figure 7:
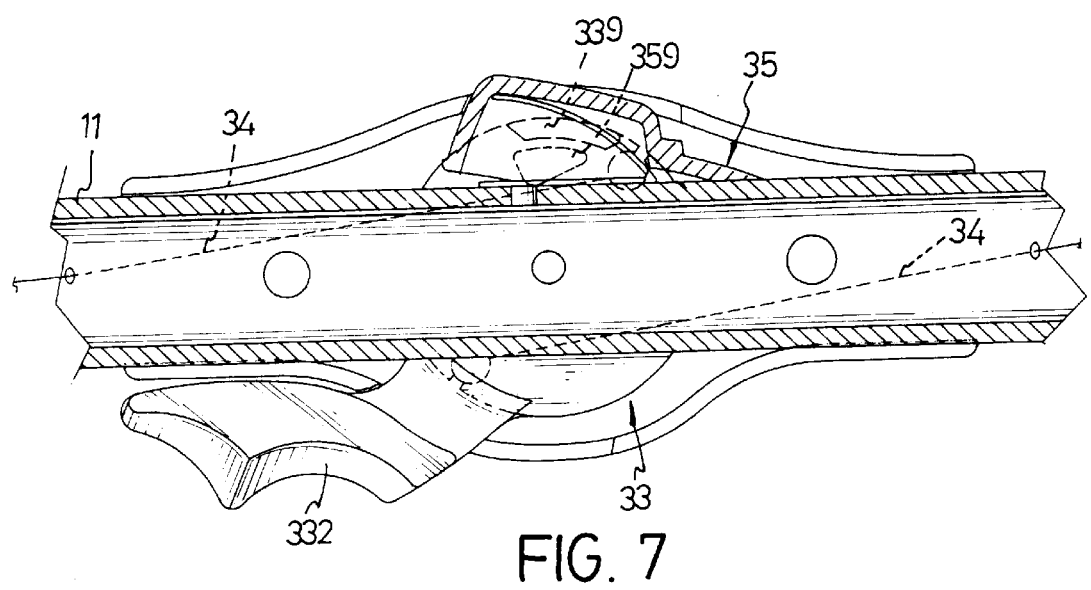
FIG. 7 is a plan view of the controlling device illustrating movement of a disk of the controlling device.
Figure 9:
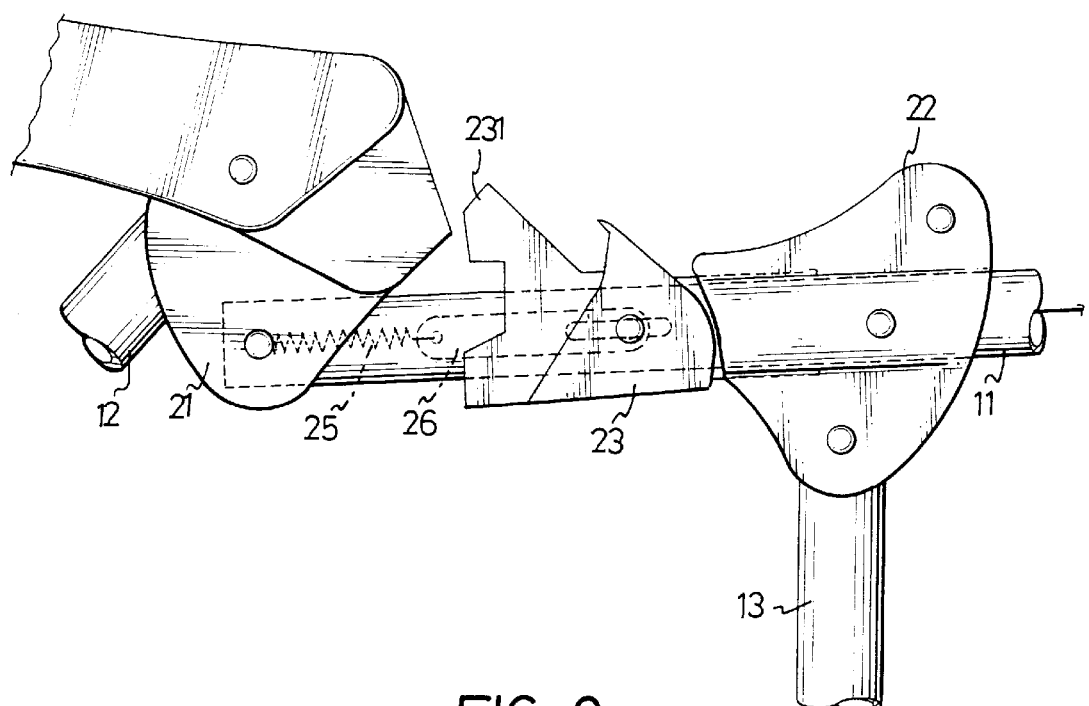
FIG. 9 is a plan view of the folding device in which the slidable Seat is disengaged from the positioning seat.

For folding the stroller, referring to FIGS. 6 and 7, the user may firstly press the button 358 to disengage the latch 35 to cause the latch 35 to move downwardly whereby the stop 358 does not contact the arcuate flange 339 and the disk 33 can be rotated. Then, the disk 33 is turned by pushing the lever 332 toward the handle tube 11 simultaneously causing the cables 34 to move. Referring to FIG. 9, at the same time, the cables 34 draw the couplings 26 together with the slidable seat 23 to move upwardly and then the slidable seat 23 is disengaged from the positioning seat 21, thus the user may then press the handle tube 11 forwardly whereby the stroller is folded. For unfolding the stroller, the user may pull the handle tube 11 upwardly to cause the slidable seat 23 to engage with the positioning seat 21.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A foldable stroller comprising:

a pair of front members each having a lower end to which front wheel means is mounted and a pair of rear members each having a lower end to which rear wheel means is mounted;

a handle tube having a central portion and two side portions, each with a lower end;

a controlling device mounted to a central portion of the handle tube, wherein the controlling device includes a front cover. a rear cover, a disk pivotably retained to the central portion of the handle tube between the rear cover and the front cover a latch pivotably retained by the front cover and disposed between the front cover and the rear cover, and a resilient element securely retained between the central portion of the handle tube and the latch to upwardly urge against the latch. wherein the disk includes a lever integrally extending therefrom, a bore defined through a center of the disk, two opposite circumferential grooves. each defined in a peripheiy of the disk and terminating in a transverse slot, and an arcuate flange integrally extending from a top of a sidewall of the disk;

a folding device interconnecting an upper end of each of the pair of front members, an upper end of each of the pair of rear members and an associated lower end of the side portions of the handle tube and comprising:

a positioning seat securely mounted to each of the upper ends of the front members;

a slidable seat slidably disposed on the upper end of the positioning seat and defining a first receptacle and a retainer seat mounted on top of the slidable seat and defining a second receptacle. whereby each lower end of the handle tube extends through the second receptacle and the first receptacle and then securely mounted to the positioning seat by a pin; and means for linlcling the controlling device to the folding device.

2. The foldable stroller as claimed in claim 1 wherein the latch comprises a middle portion with two arcuate limbs spaced apart and extending downwardly from the latch, each limb defining a through hole for pivotably attaching the latch to the front and rear covers, a button integrally extending upwardly from the latch and a stop integrally extending from an inner face of one of the limbs and configured to abut the arcuate flange of the disk when the foldable stroller is in a non-folded condition.

3. The foldable stroller as claimed in claim 1 wherein the linking means comprises a cable with a first end and a second end, a coupling with a first end and a second end, a spring with a first and a second end, and a linking pin, whereby the linking pin is received in an elongate hole defined in each lower end of the handle tube and extends through the first end of the coupling, the first end of the spring engages with the second end of the coupling, the coupling receives the second end of the cable, the first end of the cable is received in the disk such that when the cable is pulled via rotation of the disk, the slidable seat is removed.

4. The foldable stroller as claimed in claim 3 wherein the cable is disposed within the handle tube.

5. The foldable stroller as claimed in claim 1 wherein each of the rear members is pivotally mounted to the retainer seat.

6. A foldable stroller comprising:

a pair of front members each having a lower end to which front wheel means is mounted and a pair of rear members each having a lower end to which rear wheel means is mounted;

a handle tube having a central portion and two side portions, each with a lower end;

a controlling device mounted to a central portion of the handle tube, wherein the controlling device includes a front cover, a rear cover, a disk pivotably retained to the central portion of the handle tube between the rear cover and the front cover, a folding device interconnecting an upper end of each of the pair of front members, an upper end of each of the pair of rear members and an associated lower end of the side portions of the handle tube and comprising:

a positioning seat securely mounted to each of the upper ends of the front members;

a slidable seat slidably disposed on the upper end of the positioning seat and defining a first receptacle; and a retainer seat mounted on top of the slidable seat and defining a second receptacle, whereby each lower end of the handle tube extends through the second receptacle and the first receptacle and then securely mounted to the positioning seat by a pin; and means for linldng the controlling device to the folding device including a cable with a first end and a second end, a coupling with a first end and a second end, a spring with a first and a second end, and a linking pin, whereby the linking pin is received in an elongate hole defined in each lower end of the handle tube and extends through the first end of the coupling, the first end of the spring engages with the second end of the coupling, the coupling receives the second end of the cable, the first end of the cable is received in the disk such that when the cable is pulled via rotation of the disk, the slidable seat is removed.

7. The foldable stroller as claimed in claim 6 wherein the cable is disposed within the handle tube.

* * * * *